(12) United States Patent
Ding et al.

(10) Patent No.: US 8,595,332 B2
(45) Date of Patent: Nov. 26, 2013

(54) REMOTE LOADING SYSTEM AND METHOD FOR NETWORK EQUIPMENT

(75) Inventors: Zhiming Ding, Shenzhen (CN); Meng Diao, Shenzhen (CN); Bo Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 12/126,064

(22) Filed: May 23, 2008

(65) Prior Publication Data

US 2008/0263182 A1    Oct. 23, 2008

Related U.S. Application Data

(63) Continuation of application No. PCT/CN2006/003132, filed on Nov. 21, 2006.

(30) Foreign Application Priority Data

Nov. 24, 2005 (CN) .......................... 2005 1 0101834

(51) Int. Cl.
  *G06F 15/177* (2006.01)
(52) U.S. Cl.
  USPC ........................... 709/220; 709/219; 709/222
(58) Field of Classification Search
  USPC ...................... 709/203, 219, 220, 221, 222
  See application file for complete search history.

(56) References Cited

U.S. PATENT DOCUMENTS

| | | | | |
|---|---|---|---|---|
| 6,070,012 | A * | 5/2000 | Eitner et al. | 717/168 |
| 6,457,175 | B1 * | 9/2002 | Lerche | 717/173 |
| 6,473,099 | B1 | 10/2002 | Goldman et al. | |
| 6,493,871 | B1 | 12/2002 | McGuire et al. | |
| 6,681,389 | B1 | 1/2004 | Engel et al. | |
| 6,751,794 | B1 * | 6/2004 | McCaleb et al. | 717/168 |

(Continued)

FOREIGN PATENT DOCUMENTS

| | | |
|---|---|---|
| CN | 1285935 A | 2/2001 |
| CN | 1617496 A | 5/2005 |

(Continued)

OTHER PUBLICATIONS

"CPE WAN Management Protocol," *DSLHome—Technical Working Group*, 1-90 (May 2004) http://www.dslforum.org/aboutds1/Technical_Reports/TR-069.pdf>.

(Continued)

*Primary Examiner* — Mohamed Ibrahim
(74) *Attorney, Agent, or Firm* — Leydig, Voit & Mayer, Ltd.

(57) ABSTRACT

A remote loading system for network equipment is provided, which includes a loading server configured to send a loading command and an equipment prepared for loading connected to the loading server through a network. The loading server sends a command for validating a loaded content to the equipment prepared for loading, and the equipment prepared for loading performs an operation of validating the loaded content according to the command for validating the loaded content. A corresponding remote loading method for network equipment is also provided. A control on validating the loaded content is achieved through the command for validating a loaded content. Moreover, a way of validating the loaded content immediately and a way of validating the loaded content through a specific program are respectively adopted to realize the loading of an unconditionally resetting equipment and a conditionally resetting equipment.

13 Claims, 4 Drawing Sheets

(56) References Cited

U.S. PATENT DOCUMENTS

| | | | |
|---|---|---|---|
| 6,766,364 B2 * | 7/2004 | Moyer et al. | 709/221 |
| 6,880,156 B1 | 4/2005 | Landherr et al. | |
| 7,389,409 B2 * | 6/2008 | Swanson et al. | 713/1 |
| 2002/0077094 A1 | 6/2002 | Leppanen | |
| 2003/0093688 A1 | 5/2003 | Helgesen et al. | |
| 2003/0208609 A1 * | 11/2003 | Brusca | 709/230 |
| 2004/0006612 A1 * | 1/2004 | Jibbe et al. | 709/223 |
| 2005/0228874 A1 * | 10/2005 | Edgett et al. | 709/220 |

FOREIGN PATENT DOCUMENTS

| | | |
|---|---|---|
| CN | 1635760 A | 7/2005 |
| CN | 1673958 A | 9/2005 |
| CN | 100512116 C | 7/2009 |
| EP | 1 096 445 A2 | 5/2001 |
| GB | 2 386 209 A | 9/2003 |
| WO | WO 02/01353 A1 | 1/2002 |
| WO | WO 2005/067254 A1 | 7/2005 |

OTHER PUBLICATIONS

Digital Cellular Telecommunications System (Phase 2+); Universal Mobile Telecommunications Systems (UMTS); Telecommunication Management; Configuration Management (CM); Bulk CM Integration Reference Point (RP); Information Service (IS), *ETSI Technical Specification 132 612*, V6.4.0, Release 6: 1-57 (2005).

Written Opinion of the International Searching Authority in corresponding PCT Application No. PCT/CN2006/003132 (Mar. 15, 2007).

$3^{rd}$ Office Action in corresponding European Application No. 06828173.2 (Sep. 7, 2010).

$1^{st}$ Office Action in corresponding Chinese Application No. 2005101018342 (Jul. 6, 2007).

$4^{th}$ Office Action in corresponding Chinese Application No. 2005101018342 (Oct. 31, 2008).

Oral Proceedings in corresponding European Application No. 06828173.2 (Jun. 24, 2011).

International Search Report in corresponding PCT Application No. PCT/CN2006/003132 (Mar. 15, 2007).

Minutes of the Oral Proceedings in corresponding European Application No. 06828173.2 (Dec. 7, 2011).

\* cited by examiner

REMOTE LOADING SYSTEM AND METHOD FOR NETWORK EQUIPMENT

CROSS-REFERENCE TO RELATED APPLICATIONS

This application is a continuation of International Patent Application No. PCT/CN2006/003132, filed Nov. 21, 2006, which claims priority to Chinese Patent Application No. 200510101834.2, filed Nov. 24, 2005, both of which are hereby incorporated by reference in their entirety.

FIELD OF THE INVENTION

The present invention relates to a network technology, in particular, to a remote loading system and method for network equipment.

BACKGROUND OF THE INVENTION

Figure 1:
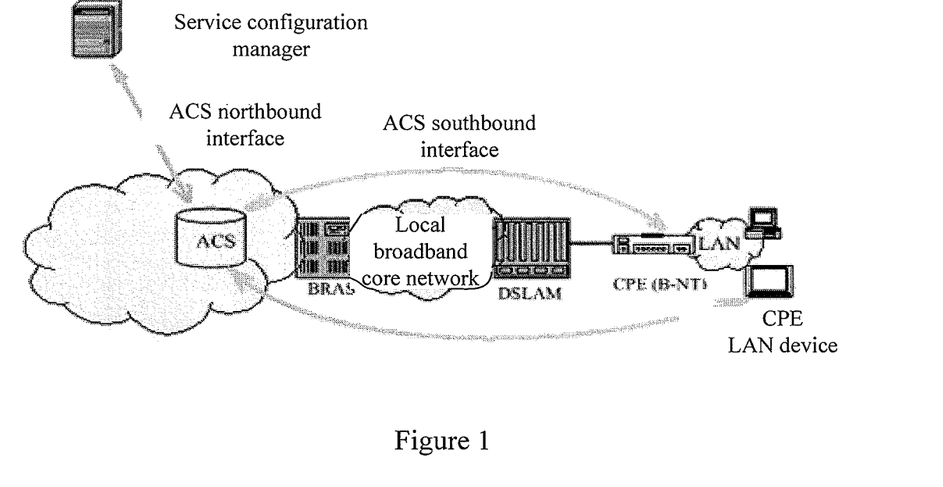
FIG. 1 is a schematic structure diagram of a DSL.

Digital subscriber loop (DSL) has been widely used as a broadband access technology, and a typical networking scheme thereof is shown in FIG. 1. One or more customer premises equipments (CPEs) are connected to an auto-configuration server (ACS) through a DSL access multiplexer (DSLAM), a local broadband core network, and a broadband remote access server (BRAS). The ACS is connected to a service configuration manager through an ACS northbound interface.

DSL brings a wide range of broadband technology application, such as, VoIP and IPTV, and so on. Various kinds of IP-based terminal equipment, i.e., IP application terminals referred to as CPE in this field, are developed based on broadband technology applications or combinations thereof. Due to the possible defects of implementation, it is usually necessary for the IP application terminals to upgrade the software running thereon or update the configurations, so as to acquire a higher level of stability, and even a higher level of security and availability. The upgrade of software or the update of configuration also aims to add new functions for the equipment so as to better serve the users. The upgrade of software or the configuration on the IP application terminal is usually realized through file loading.

The above IP application terminal for the most part includes two loading methods. In one method, a command/message is transmitted from the outside of the IP application terminal to the terminal, so as to enable the terminal to load. In the other method, the IP application terminal checks itself with the relevant information periodically so as to realize the loading.

Currently, a series of technical reports (TR) on the CPE with TR-069 as the core are provided to define the operation frame of equipment management and automatic configuration based on an HTTP protocol. The CPE works as an HTTP client, i.e., an equipment prepared for loading; ACS works as an HTTP server, that is, a loading server. The CPE and ACS respectively provide some methods which can be invoked by the other. The methods are responding to a message in accordance with the standard, accomplishing the function specified by the message, and returning the result to the message transmitter. The method for invoking the remote equipment is transmitting a specific message to the equipment and waiting for the result to be returned by the equipment after processing the message. The invoker and provider of the method may transmit and process the message based on the HTTP protocol.

TR-069 defines that CPE provides a download method for ACS invoking remotely in order to realize the functions such as software upgrade and configuration update of the equipment, and describes the parameters included in the download method. As stipulated in TR-069, after the ACS invokes the download method of the CPE, the CPE can not be reset to accomplish the software upgrade and configuration update. The method and time for upgrading or updating configuration of the CPE depend on CPE, and the loaded content is usually validated to accomplish loading without influencing the online service.

However, under some special circumstances, e.g., when a fault diagnosis is performed on the equipment or an upgrade application on the equipment for providing new services is submitted, the file fails to be loaded by the equipment due to continuous on-line service or the file is loaded but can not be reset so that the loaded content can not be validated at once. Thereby, the diagnosis can not be conducted or the new service can not be provided in a real time, and human interference (e.g., manually resetting the equipment or rebooting the power) is required to accomplish the update operation, so as to accomplish the upgrade finally. However, the user may not be present during the diagnosis or upgrade, and at this time, an enforced resetting method is usually used, which, however, may interrupt the online service and may cause a loss for the user.

Moreover, during a common upgrade process, the file may fail to be loaded or fail to be validated after being loaded due to the extended time on-line service, so that the latest version can not be achieved, and the update makes no sense.

SUMMARY OF THE INVENTION

The present invention provides a remote loading system and method for network equipment, for overcoming the defect in the prior art of forcing to interrupt the on-line service or failing to load due to the service being on line.

The present invention also provides a customer premises equipment (CPE) accepting the loading service of an auto-configuration server (ACS).

The present invention adopts the following technical solutions:

The present invention provides a remote loading system for network equipment, which includes:

a loading server, configured to send a command for validating a loaded content to an equipment prepared for loading; and an equipment prepared for loading, connected to the loading server through a network, configured to perform an operation of validating the loaded content according to the command for validating the loaded content.

The present invention further provides a remote loading method for network equipment, which includes:

sending, by a loading server, a command for validating a loaded content to an equipment prepared for loading through a network; and performing, by an equipment prepared for loading, an operation of validating the loaded content according to the command for validating the loaded content.

The present invention further provides a customer premises equipment (CPE), which includes:

a loading processing module, configured to perform an operation of validating a loaded content according to a command for validating the loaded content sent by an ACS.

Based on the above technical solution, the command for validating the loaded content is generated at the loading server, and is sent to the equipment prepared for loading, so as to control the validation of the loaded content. Moreover, a way of validating the loaded content immediately and a way of validating the loaded content through a specific program are respectively adopted in the present invention to realize the loading of an unconditionally resetting equipment and a conditionally resetting equipment.

DETAILED DESCRIPTION OF THE INVENTION

Hereinafter the present invention is illustrated in detail with reference to the drawings and embodiments. It should be understood that, the specific embodiments in the detailed description are merely given for illustrating the present invention, instead of limiting the present invention.

Figure 2:
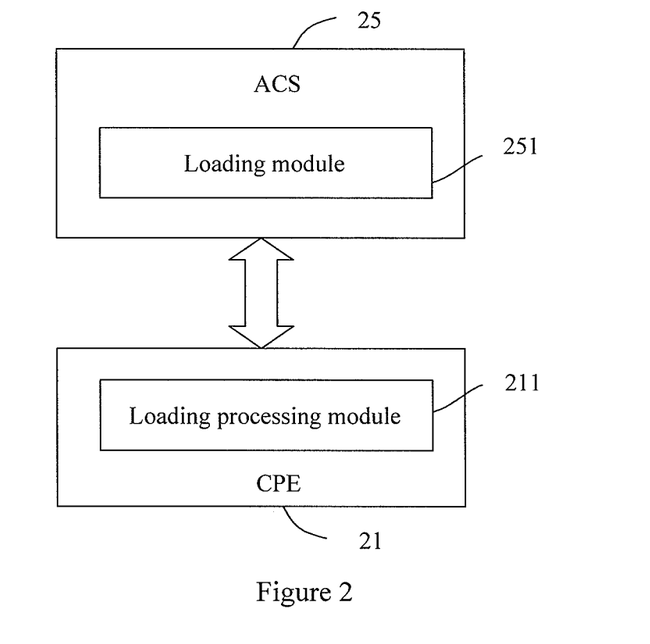
FIG. 2 is a schematic diagram of a remote loading system for network equipment according to the present invention.

FIG. 2 is a schematic diagram of a remote loading system for network equipment according to an embodiment of the present invention. As shown in FIG. 2, in this embodiment, the remote loading system for network equipment includes a remote loading server and an equipment prepared for loading communicating with the loading server through a network. In this embodiment, the loading server is an auto-configuration server (ACS) 25, the equipment prepared for loading is a customer premises equipment (CPE) 21, and the network is a digital subscriber line (DSL) network. The ACS 25, the CPE 21, and the network all conform to the CPE wide area network (WAN) management protocol. The ACS may also be replaced with a network management server.

Definitely, the system and the method in the present invention are also adapted to other networks, and hereinafter the DSL network is taken as an example for illustrating the present invention.

The ACS 25 sends a downloading command/message (hereinafter referred to loading command for short) to the CPE 21, and the loading command is generated and sent by a loading module 251. The CPE 21 receives the loading command, downloads a content according to the loading command, and performs relevant operations. The loading command includes a plurality of parameters, such as address and size of the download file, and so on. The CPE 21 includes a loading processing module 211 configured to execute the loading command, including downloading the content, installation, or configuration of the loaded content.

Moreover, in this embodiment, the loading module 251 further generates a command for validating the loaded content to control the way of validating the loaded content of the CPE 21, including validating immediately and validating through a specific program, and so on. The way of validating the loaded content is determined mainly based on the objective of upgrade, such as service upgrade, error correction, and problem diagnosis, and so on. The way of validating the loaded content may also be determined based on the equipment type. For example, the equipment having no loss or little loss caused by the service interruption, such as IPTV, may adopt the way of validating the loaded content immediately, that is, the equipment is rebooted immediately after the loading. The equipment having a large loss caused by the service interruption, such as IP telephone, adopts the way of validating the loaded content through a specific program.

In one embodiment, the command for validating the loaded content is realized based on parameters. That is, the loading command contains parameters concerning the way of validating the loaded content, and the loading processing module 211 determines the way of validating the loaded content according to the parameters. The parameters in the loading command concerning the way of validating the loaded content are given in Table 1.

TABLE 1

Table of parameters carried in the loading command

| Parameter | Data Type | Description |
|---|---|---|
| CommandKey | String (32 bytes) | A command word, replaced with Download in this embodiment. |
| FileType | String (64 bytes) | A number followed by a space and followed by a description on the file type, for example:<br>"1 Firmware Upgrade Image"<br>"2 Web Content"<br>"3 Vendor Configuration File" |
| URL | String (256 bytes) | A URL for specifying the file location |
| Username | String (256 bytes) | A user name of the CPE authentication file server, which indicates no need for authentication if being null |
| Password | String (256 bytes) | A password of CPE authentication file server, which is null when no authentication is required |
| FileSize | Unsigned integer | A size of the file to be downloaded (total number of bytes) |
| TargetFileName | String (256 bytes) | A file name, which may be null. |
| DelaySeconds | Unsigned integer | The seconds of delaying to download required by the CPE when the method is invoked (i.e., the message is received), if being 0, it indicates no delay, and if being not 0, it indicates the seconds to be delayed, and the file transmission should be executed through an additionally established connection (HTTP is connected based on TCP). |

TABLE 1-continued

Table of parameters carried in the loading command

| Parameter | Data Type | Description |
| --- | --- | --- |
| EffectiveNow | Integer (0:1) | It indicates whether the file loaded at this time needs to be validated immediately.<br>0: it indicates adopting the way of validating the loaded content through a specific program, determining when to validate the loaded content according to the equipment situation by the CPE, within a time limit, e.g., 24 hours, and selecting unconditional automatic validation or prompting the user to intervene validation when the time limit is exceeded.<br>1: It indicates that the equipment should validate the loaded content immediately after the loading in any way. |
| SuccessURL | String (256 bytes) | If the file download succeeds, the CPE makes an access to the URL. |
| FailureURL | String (256 bytes) | If the file download fails, the CPE makes an access to the URL. |

In Table 1, the parameter EffectiveNow is a parameter of the manner of validating the loaded content in the loading command. In some embodiment, the parameter EffectiveNow is Boolean type, and when the parameter EffectiveNow is 0, the way of validating through a specific program is adopted. For example, when some service is operated on the CPE 21, the loading processing module 211 validates the loaded content after delaying some time or waits for the intervention of the user, or the equipment may actively switch the state after exceeding a time limit so as to force to validate the loaded content. When the parameter EffectiveNow is 1, the way of validating the loaded content immediately is adopted, that is to say, the loading processing module 211 validates the loaded content immediately after loading by, for example, a method such as powering down and rebooting, no matter whether the equipment has services on line or not.

Definitely, the parameter EffectiveNow is not limited to Boolean type, it can be an integer parameter to define more ways for validation, for example, the way of validating the loaded content until all the services on the CPE 21 stop running, and the way of waiting for the intervention of the user after loading and validating the loaded content if no intervention of the user is provided within a predetermined time.

It can be understood that, the command for validating the loaded content is not limited to the above EffectiveNow parameter way, a specific command or message independent from the loading command may also be adopted as the command for validating the loaded content, and other parameters of the loading command may be given more values for indicating the content validation.

Moreover, the CPE 21 further includes an alarm module (not shown in FIG. 2). Under a non-immediately validating way, the alarm module may inform the user perform manual intervention with voice/sound prompt, screen text/sign prompt, E-mail of the user, other terminals of the user having the function of short message, and other widely used communication system supported by operators, when the CPE 21 fails to download file within a period of time (e.g., 24 hours), or fails to validate the loaded content within a period of time (e.g., 24 hours) after loading due to some reasons (e.g., on-line services). The CPE 21 may send a notice directly, or inform the ACS 25 to send a notice together with the relevant management equipment.

Figure 3:
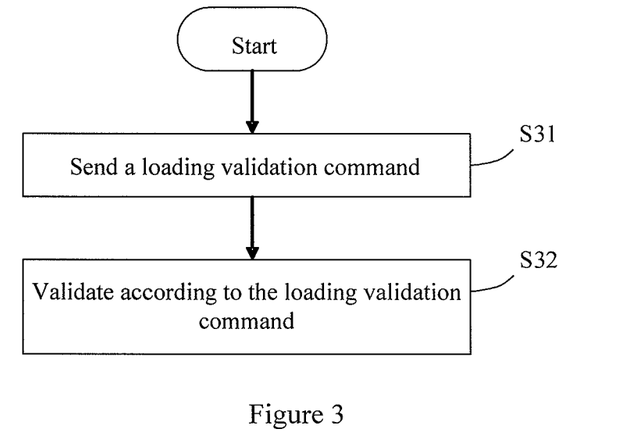
FIG. 3 is a flow chart of a remote loading method for network equipment according to the present invention.

FIG. 3 is a flow chart of a remote loading method for network equipment according to the present invention. As shown in FIG. 3, the loading module 251 of the ACS 25 sends the command for validating the loaded content to the CPE 21 through a network (Block S31); in responding to the CPE 21 receiving the command for validating the loaded content, the loading processing module 211 processes the command for validating the loaded content, so as to validate the loaded content in different ways (Block S32).

Figure 4:
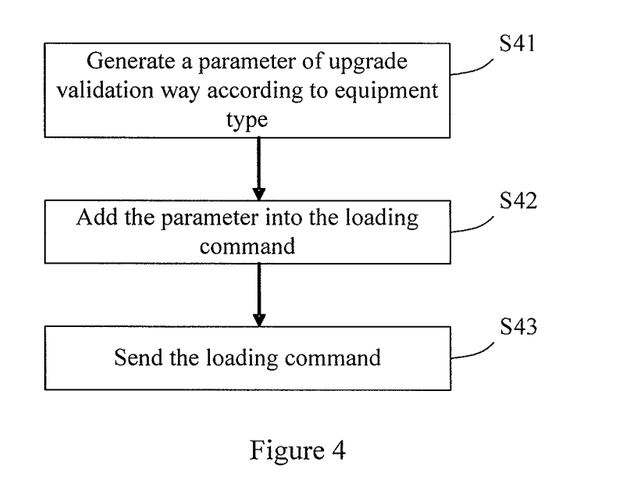
FIG. 4 is a flow chart of sending a command for validating the loaded content in FIG. 3.

FIG. 4 is a flow chart of sending the command for validating the loaded content in FIG. 3. As shown in FIG. 4, according to the loading of the CPE 21, the ACS 25 generates a parameter of the way of validating the loaded content according to the equipment type of the CPE 21. In some embodiments, the parameter of validating the loaded content is a Boolean-type EffectiveNow parameter, when being a preset invalidation value, e.g., being 0, the way of validating the loaded content through a specific program is adopted, and when being a preset validation value, e.g., being 1, the way of validating immediately is adopted (Block S41).

The ACS 25 adds the EffectiveNow parameter into the loading command (Block S42), and sends the loading command to the CPE 21 to be loaded (Block S43).

Figure 5:
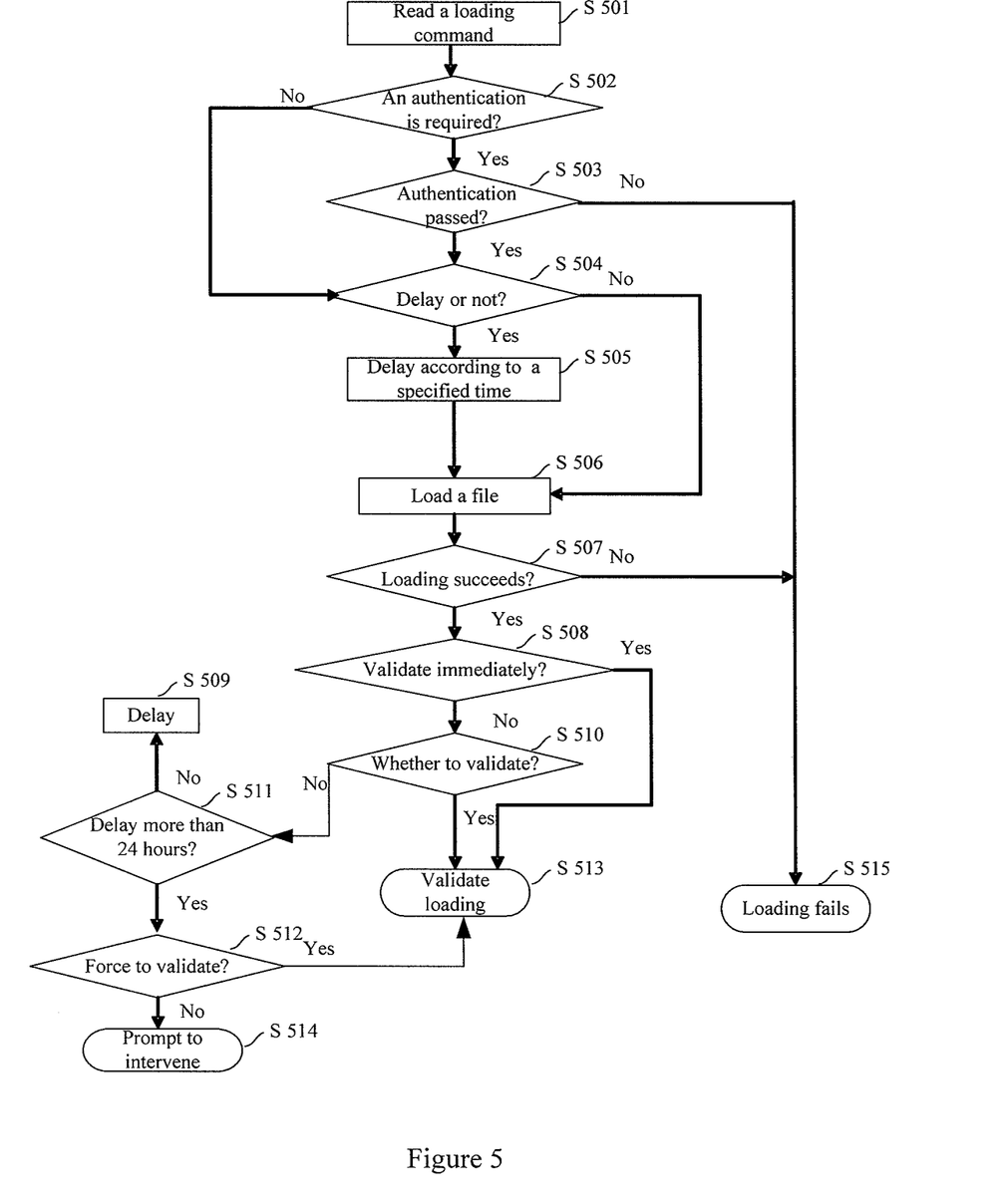
FIG. 5 is a flow chart of validating the loaded content in FIG. 3.

FIG. 5 is a flow chart of validating the loaded content in FIG. 3.

Block S501: The CPE 21 receives the loading command from the ACS 25, and reads every parameter in the loading command.

Block S502: The loading processing module 211 determines whether an authentication is required or not, i.e., whether the CPE 21 is legal or not, according to an authentication parameter in the loading command.

If the authentication is not required (in some embodiments, it means that the Username parameter or the Password parameter in the loading command are null), Step S504 is executed (described hereinafter). If the authentication is required (in some embodiments, it means that the Username parameter or the Password parameter in the loading command are not null), the authentication is executed, i.e., the user name and password of the CPE authentication file server are verified, and whether to pass the authentication or not is determined (Block S503).

If the authentication is not passed, a loading failure process is executed, for example, a loading failure is prompted (Block S521). If the authentication is passed, the loading processing module 211 determines whether to delay downloading the content or not according to the DelaySeconds parameter in the loading command (Block S504).

If delay is required, i.e., the value of the DelaySeconds parameter is not 0, the time specified by the DelaySeconds parameter is delayed (Block S505), and files are loaded according to the URL parameter and the TargetFileName parameter in the loading command (Block S506). If delay is not required, i.e., the value of the DelaySeconds parameter is 0, Block S506 is executed directly.

Then, the loading processing module 211 of the CPE 21 determines whether the loading succeeds or not according to the loading situation (Block S507).

If the loaded content is successfully loaded, it is determined whether to validate the loaded content immediately according to the EffectiveNow parameter (Block S508); if the loaded content is not loaded successfully, Block S515 is executed then.

If the loaded content is validated immediately, i.e., the EffectiveNow parameter value is 1, the loaded content is validated immediately by means of, for example, powering down and rebooting, so as to accomplish the loading operation (Block S513). If a way of validating the loaded content immediately is not adopted, but a way of delaying to validate is adopted, and the value of the EffectiveNow parameter is 0, whether the condition for validating the loaded content is satisfied or not is determined according to the service operation situation of the CPE 21 (Block S510). The condition for validating the loaded content includes the equipment is idle, the user instructs to validate, or a waiting time exceeds a predetermined time.

If the CPE 21 satisfies the condition for validating the loaded content (for example, no service is operated on the CPE 21, i.e., the equipment is idle), the loaded content is validated (Block S513). If the CPE 21 does not satisfy the condition for validating the loaded content, for example, if some service is operated on the CPE 21, a predetermined time may be delayed (e.g., 24 hours), and whether the delay exceeds the predetermined time or not is judged. Judging whether the delay exceeds the predetermined time may be executed based on a predetermined period (Block S511).

If the delay does not exceed the predetermined time, keep waiting (Block S509), and Step S510 is executed. If the delay exceeds the predetermined time, whether to force to validate or not is determined according to the specific loading program subscribed by the system (Block S512).

If it is not required to force to validate, a prompt for user intervention is given through voice/sound prompt, screen text/sign prompt, E-mail of the user, other terminals of the user having the function of short message, and other widely used communication system supported by operators (Block S514); if it is required to force to validate, Block S513 is executed.

It should be noted that, in some embodiment, whether immediately loading or delaying to load is not determined before the file loading. The present invention further includes determining whether immediately loading or delaying to load before the file loading, because the on-line service may be affected during the file loading, and some equipment needs to be rebooted to start loading.

In some embodiments, the operation of loading file and the operation of validating the loaded content are two different operations. It should be noted that, the operation of validating the loaded content may include the operation of loading file, in other words, the operation of loading file and the operation validating the loaded content are incorporated into one operation.

Figure 6:
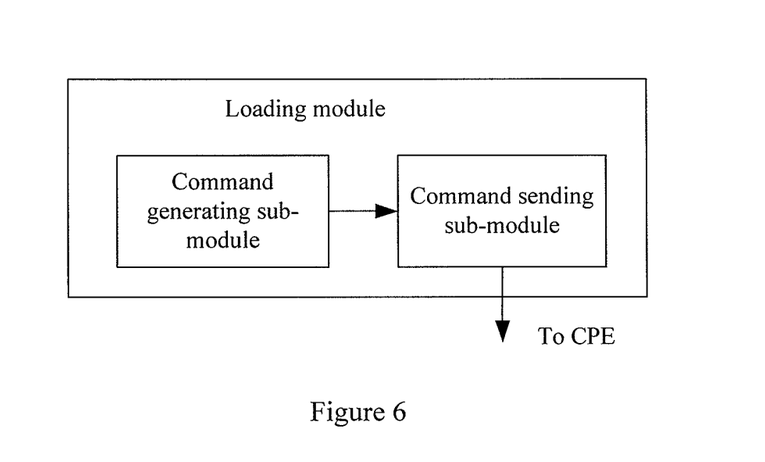
FIG. 6 is a schematic diagram of an ACS according to the present invention.

The present invention further discloses an ACS, providing a loading service to, for example, the equipment prepared for loading of the CPE. FIG. 6 is a schematic diagram of the ACS according to the present invention. As shown in FIG. 6, the ACS includes:

a loading module, configured to determine and generate a command for validating the loaded content, and send the command for validating the loaded content to the equipment prepared for loading.

The loading module includes a command generating sub-module and a command sending sub-module.

The command generating sub-module is configured to determine and generate the command for validating the loaded content, and transmit the command for validating the loaded content to the command sending sub-module. For example, the equipment having no loss or little loss caused by the service interruption, such as IPTV, may adopt the way of validating the loaded content immediately, i.e., the equipment is rebooted immediately after the loading. The equipment having a large loss caused by the service interruption, such as IP telephone, adopts the way of validating the loaded content through a specific program.

The command sending sub-module is configured to send the command for validating the loaded content to the equipment prepared for loading. The command for validating the loaded content can be sent to the equipment prepared for loading through containing the parameters concerning the way of validating the loaded content in the loading command, and the equipment prepared for loading determines the way of validating the loaded content according to the parameters.

Figure 7:
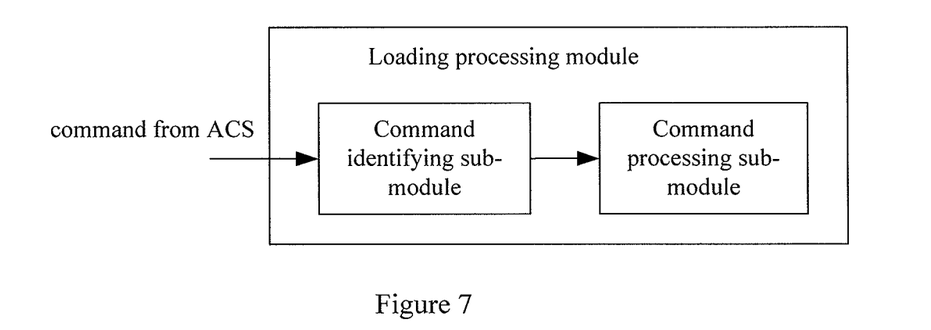
FIG. 7 is a schematic diagram of a CPE according to the present invention.

The present invention further provides a CPE for accepting the loading service of the ACS. FIG. 7 is a schematic diagram of the ACS according to the present invention. As shown in FIG. 7, the CPE includes:

a loading processing module, configured to perform an operation of validating the loaded content according to the command for validating the loaded content sent by the ACS.

Furthermore, the loading processing module includes a command identifying sub-module and a command processing sub-module.

The command identifying sub-module is configured to receive and identify the command for validating the loaded content. As mentioned above, the command for validating the loaded content may include the way of immediately validating and the way of delaying to validate.

Figure 8:
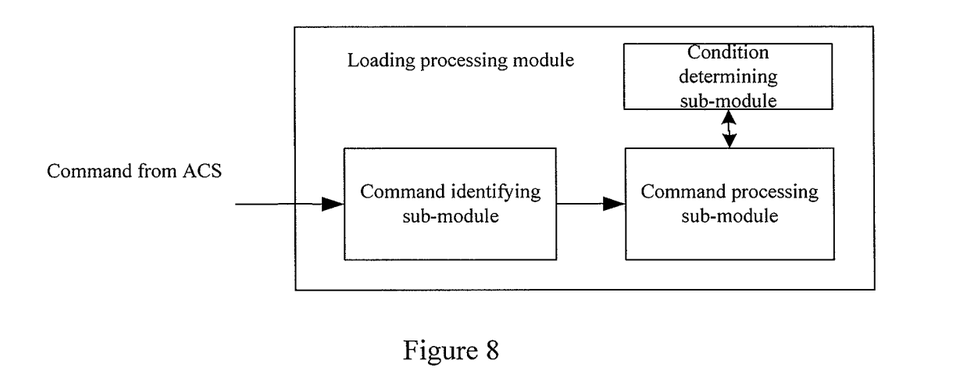
FIG. 8 is a schematic diagram of a CPE having a preferable structure according to the present invention.

The command processing sub-module is configured to perform the operation of validating the loaded content according to the command for validating the loaded content identified by the command identifying sub-module. For example, as for the way of immediately validating, the loaded content is validated immediately by means of, for example, powering down and rebooting, so as to accomplish the loading operation. As for the way of delaying to validate, it is determined whether the condition for validating the loaded content is satisfied or not; if satisfied, the loaded content is validated; if not satisfied, the loaded content is validated after a predetermined time. FIG. 8 is a schematic diagram of a CPE having a preferable structure according to the present invention. As shown in FIG. 8, the loading processing module in the CPE not only includes the command identifying sub-module and the command processing sub-module as shown in FIG. 7, but also includes a condition determining sub-module.

The condition determining sub-module determines if the loading condition is satisfied or not during starting, and notifies the command processing sub-module to perform the operation of validating the loaded content.

When the command processing sub-module receives the command for validating the loaded content indicating a validation after delaying, the condition determining sub-module is started to determine the loading condition.

The condition determining sub-module further includes a timer having a preset timeout value.

If the command processing sub-module receives the command for validating the loaded content indicating a validation after delaying, the timer is started, and the operation of validating the loaded content is immediately performed when the timer indicates a timeout.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A remote loading method for network equipment, comprising:
   obtaining, by an equipment prepared for loading, a command for applying a loaded content from a loading server through a network; wherein the command carries a parameter of a way of applying loaded content, and the way of applying the loaded content comprises a way of applying the loaded content immediately or a way of applying the loaded content according to a equipment situation;
   performing an operation of applying the loaded content immediately when the way of applying the loaded content indicated by the parameter is a way of applying the loaded content immediately; or
   performing an operation of applying the loaded content when a condition for applying the loaded content is satisfied when the way of applying the loaded content indicated by the parameter is a way of applying the loaded content according to the equipment situation; wherein the condition for applying the loaded content is that, the equipment is idle, or a user instructs to validate, or a waiting time exceeds a predetermined time.

2. The method according to claim 1, wherein the performing an operation of determining when to apply the loaded content according to the equipment situation when the way of applying the loaded content indicated by the parameter is a way of applying the loaded content according to the equipment situation comprises:
   performing the operation of applying the loaded content when a condition for applying the loaded content is satisfied in response to the parameter of the way of applying the loaded content being a preset invalidation value; and
   the condition for applying the loaded content is that, the equipment is idle, or the user instructs to validate, or a waiting time exceeds a predetermined time.

3. The method according to claim 2, wherein if the waiting time exceeds the predetermined time, the performing an operation of applying the loaded content comprises prompting the user to intervene.

4. The method according to claim 3, wherein the prompting the user to intervene comprises:
   prompting on the equipment prepared for loading with voice/sound, or screen text/sign, or e-mail, or short message.

5. The method according to claim 1, wherein the performing an operation of applying the loaded content immediately when the way of applying the loaded content indicated by the parameter is a way of applying the loaded content immediately comprises:
   performing the operation of applying the loaded content immediately in response to the parameter of the way of applying the loaded content being a preset validation value.

6. A remote loading system for network equipment, comprising:
   a loading server comprising a hardware processor and a memory, configured to determine a way of applying a loaded content, generate a parameter of the way of applying the loaded content, carry the parameter in a command for applying a loaded content, and send the command for applying a loaded content; wherein the way of applying the loaded content comprises a way of applying the loaded content immediately or a way of applying the loaded content according to a equipment situation; and
   an equipment prepared for loading, communicating with the loading server through a network, configured to receive the command for applying a loaded content and perform an operation of applying the loaded content immediately when the way of applying the loaded content indicated by the parameter is a way of applying the loaded content immediately, or perform an operation of applying the loaded content when a condition for applying the loaded content is satisfied when the way of applying the loaded content indicated by the parameter is a way of applying the loaded content according to the equipment situation; wherein the condition for applying the loaded content is that, the equipment is idle, or a user instructs to validate, or a waiting time exceeds a predetermined time.

7. The system according to claim 6, wherein the network is a digital subscriber line (DSL) based network;
   the equipment prepared for loading is a customer premises equipment; and
   the loading server is an auto-configuration server or a network management server.

8. A remote loading method for network equipment, comprising:
   determining, by a loading server, a way of applying a loaded content;
   generating, by the loading server, a parameter of the way of applying the loaded content and carrying the parameter in a command for applying a loaded content; wherein the way of applying the loaded content comprises a way of applying the loaded content immediately or a way of applying the loaded content according to a equipment situation;
   sending, by the loading server, the command for a loaded content to an equipment prepared for loading through a network; wherein, the equipment prepared for loading is configured to perform an operation of applying the loaded content immediately when the way of applying the loaded content indicated by the parameter is a way of applying the loaded content immediately, or perform an operation of applying the loaded content when a condition for applying the loaded content is satisfied when the way of applying the loaded content indicated by the parameter is a way of applying the loaded content according to the equipment situation; wherein the condition for applying the loaded content is that, the equipment is idle, or a user instructs to validate, or a waiting time exceeds a predetermined time.

9. The method according to claim 8, wherein the equipment prepared for loading is further configured to perform the operation of applying the loaded content immediately in response to the parameter of the way of applying the loaded content being a preset validation value.

10. The method according to claim 8, wherein the equipment prepared for loading is further configured to perform the operation of applying the loaded content when a condition for applying the loaded content is satisfied in response to the parameter of the way of applying the loaded content being a preset invalidation value.

11. A customer premises equipment, configured to accept a loading service of an auto-configuration server, comprising:
 a receiver, configured to receive a command for applying the loaded content sent by the auto-configuration server; and
 a processor, configured to identify the command for applying the loaded content; wherein the command carries a parameter of a way of applying loaded content, and the way of applying the loaded content comprises a way of applying the loaded content immediately or a way of applying the loaded content according to a equipment situation, and configured to perform the operation of applying the loaded content immediately when the way of applying the loaded content indicated by the parameter is a way of applying loaded content immediately, or perform an operation of applying the loaded content when a condition for applying the loaded content is satisfied when the way of applying the loaded content indicated by the parameter is a way of applying the loaded content according to the equipment situation; wherein the condition for applying the loaded content is that, the equipment is idle, or a user instructs to validate, or a waiting time exceeds a predetermined time.

12. An auto-configuration server, configured to provide loading service to an equipment prepared for loading, comprising:
 a hardware processor, configured to determine and generate a parameter of a way of applying loaded content and carry the parameter in a command for applying a loaded content; wherein the way of applying the loaded content comprises a way of applying the loaded content immediately or a way of applying the loaded content according to a equipment situation; and send the command for applying the loaded content to the equipment prepared for loading;
 wherein the equipment prepared for loading is configured to perform an operation of applying the loaded content immediately when the way of applying the loaded content indicated by the parameter is a way of applying the loaded content immediately; or perform an operation of applying the loaded content when a condition for applying the loaded content is satisfied when the way of applying the loaded content indicated by the parameter is a way of applying the loaded content according to the equipment situation; wherein the condition for applying the loaded content is that, the equipment is idle, or a user instructs to validate, or a waiting time exceeds a predetermined time.

13. The auto-configuration server according to claim 12, wherein the processor is further configured to determine and generate the command for applying the loaded content; and send the command for applying the loaded content to the equipment prepared for loading.

* * * * *